United States Patent [19]

Hattori et al.

[11] 4,071,126

[45] Jan. 31, 1978

[54] SAFETY APPARATUS IN AN AUTOMATIC TRANSMISSION FOR A VEHICLE TO PREVENT ENGAGEMENT OF THE LOW SPEED CLUTCH AT HIGH SPEEDS

[76] Inventors: Torao Hattori, 1-13-28, Shiraka, Wako, Saitama; Masakazu Maezono, 1480, Owada, Niiza, Saitama, both of Japan

[21] Appl. No.: 666,155

[22] Filed: Mar. 11, 1976

Related U.S. Application Data

[62] Division of Ser. No. 536,309, Dec. 24, 1974, abandoned.

[51] Int. Cl.² .................. F16D 25/10; F16D 43/284
[52] U.S. Cl. ........................ 192/87.12; 192/103 FA; 192/104 F
[58] Field of Search .......... 192/103 FA, 104 F, 87.12, 192/87.13, 3.26, 3.27

[56] References Cited

U.S. PATENT DOCUMENTS

| | | | |
|---|---|---|---|
| 2,637,217 | 5/1953 | Taylor | 192/87.12 X |
| 2,933,172 | 4/1960 | Fisher et al. | 192/87.13 |
| 3,182,775 | 5/1965 | Schall | 192/3.27 |
| 3,359,832 | 12/1967 | Schjolin | 192/3.26 |
| 3,534,840 | 10/1970 | Snoy | 192/103 FA |

*Primary Examiner*—Benjamin W. Wyche
*Attorney, Agent, or Firm*—Haseltine, Lake & Waters

[57] ABSTRACT

In an automatic transmission apparatus for a vehicle of the type having a high speed clutch of oil pressure operated type interposed in a high speed power transmission system and a low speed clutch of oil pressure operated type interposed in a low speed power transmission system, the clutches being selectively connected through a shift valve to an oil pressure source, a safety apparatus comprising an automatic control valve coupled to the said low speed clutch to operate when the low speed clutch rotates above a predetermined speed to bring the low speed clutch into inoperative condition.

4 Claims, 4 Drawing Figures

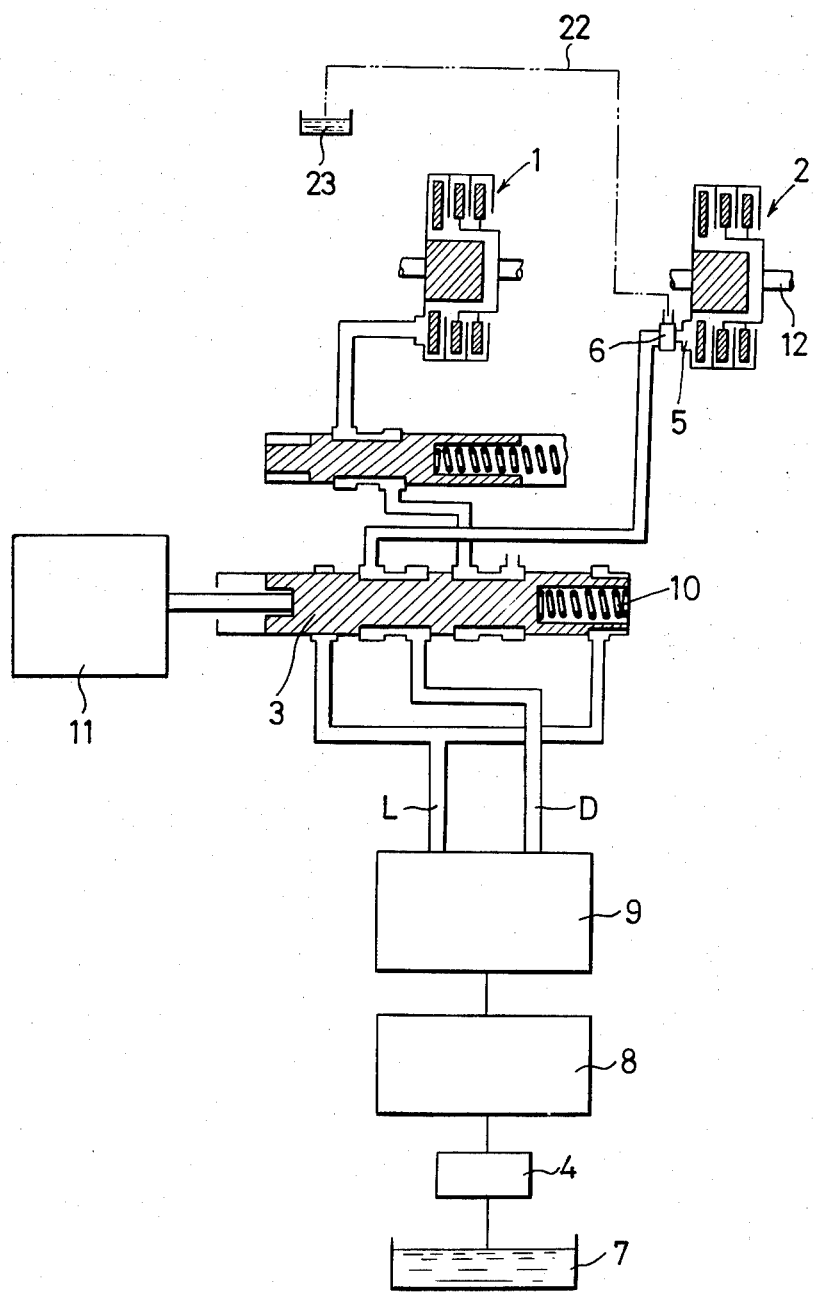

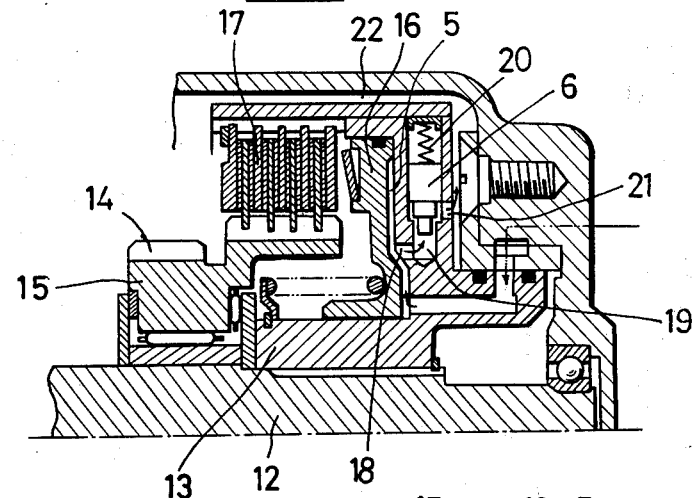
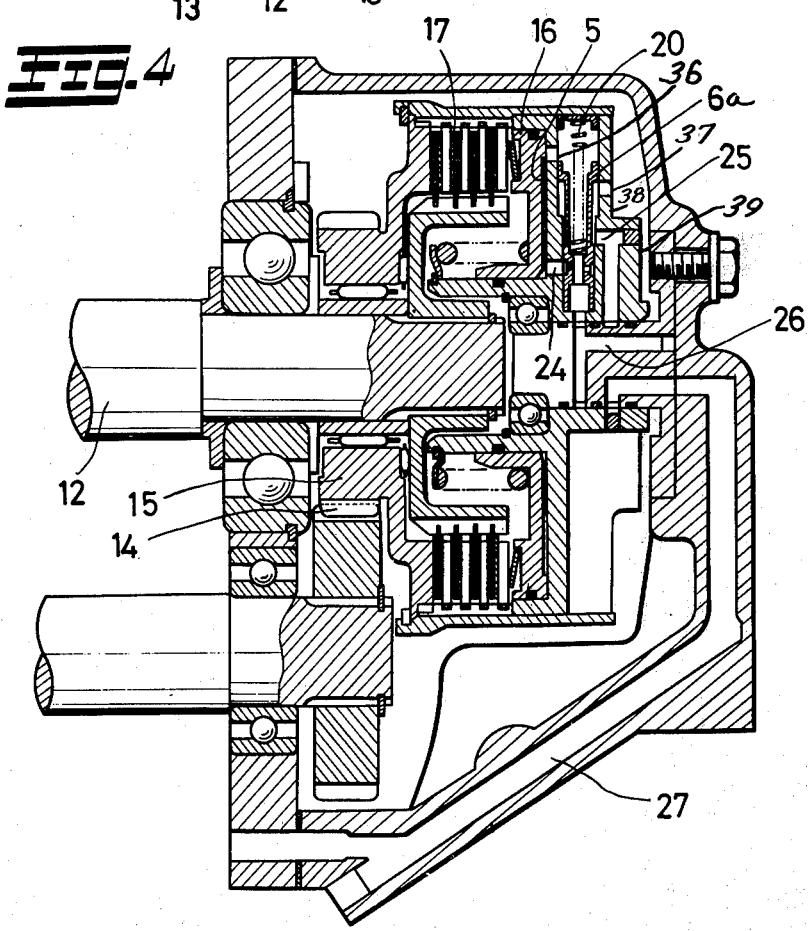

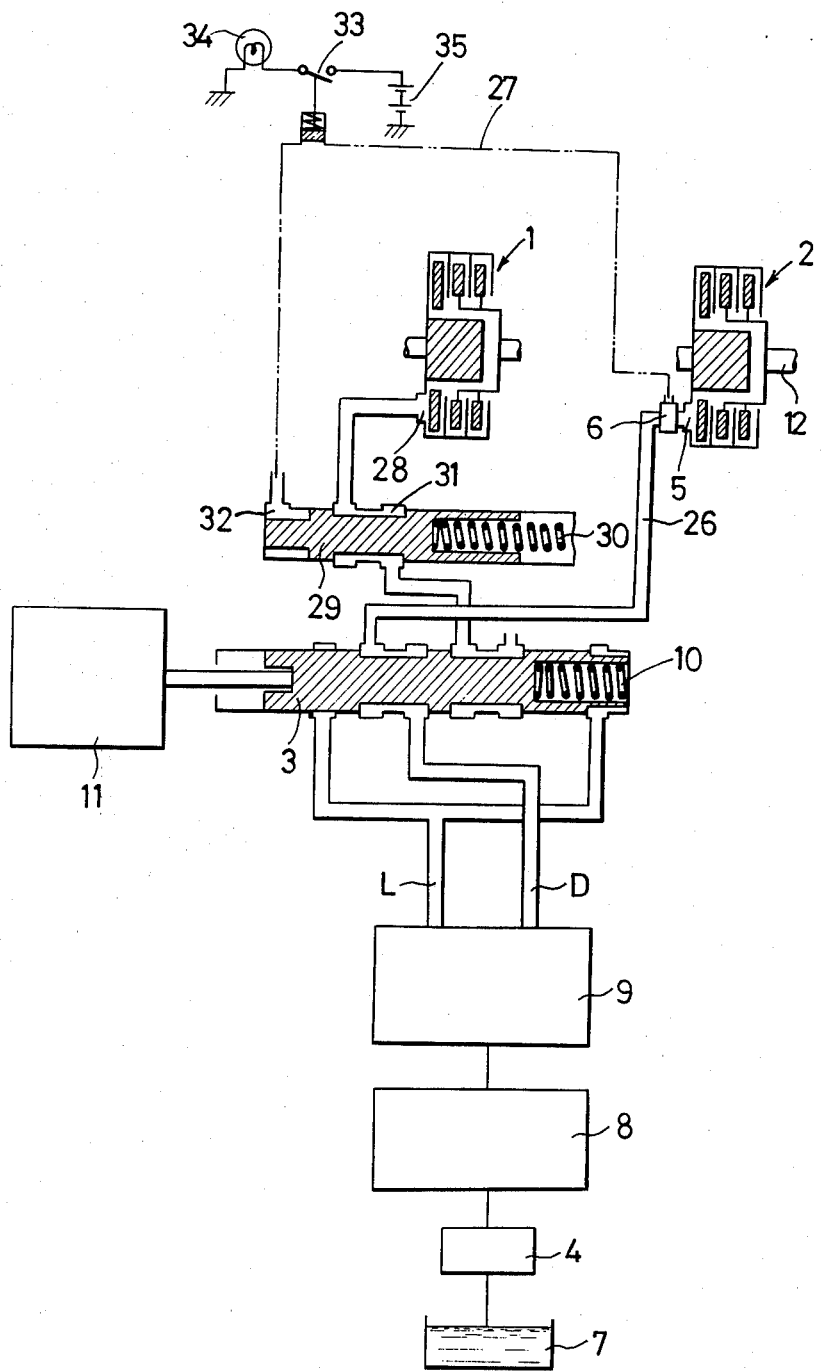

SAFETY APPARATUS IN AN AUTOMATIC TRANSMISSION FOR A VEHICLE TO PREVENT ENGAGEMENT OF THE LOW SPEED CLUTCH AT HIGH SPEEDS

CROSS-RELATED APPLICATION

This application is a Division of Ser. No. 536,309 filed Dec. 24, 1976, and now abandoned.

BACKGROUND a. Field of the Invention

The invention relates to a safety apparatus in an automatic transmission apparatus for a vehicle, such as a motorcar or the like.

b. Prior Art

An automatic transmission apparatus is known in which a high speed clutch is interposed in a high speed power transmission system and a low speed clutch is interposed in a low speed power transmission system and the clutches are selectively connected to an oil pressure source such as an oil pressure pump of the like through a shift valve responsive to a comparison value between engine output power and vehicle speed. This conventional arrangement is deficient in that, for instance, during the time when the high speed clutch is supplied with pressure oil and the vehicle runs at high speed, if the shift valve is accidentally changed over to the other side and thereby the low speed clutch is supplied with pressure oil and is brought into its operating condition, there is caused the danger of a sudden engine braking operation, engine overrunning or the like.

SUMMARY OF THE INVENTION

An object of the invention is to provide apparatus of the above type in which the foregoing deficiencies are removed.

According to the invention, in an automatic transmission apparatus of the type in which a high speed clutch of the oil pressure operated type is interposed in a high speed power transmission system and a low speed clutch of the oil pressure operated type is interposed in a low speed power transmission system, the clutches being selectively connected through a shift valve to an oil pressure source such as an oil pressure pump, the invention is characterized in that there is provided a safety apparatus comprising an automatic control valve which operates when the low speed clutch rotates above a predetermined speed so that by the operation of the valve the low speed clutch is brought to its inoperative condition. The foregoing control valve may be so constructed that by its operation, the interior of an oil pressure chamber within the low speed clutch is brought into communication with the exterior. In a modification, the same valve can be so constructed that by its operation a pressure oil supply passage is changed over from its connection with an oil pressure chamber within the low speed clutch to its connection with a passage connected to an oil pressure chamber within the high speed clutch.

BRIEF DESCRIPTION OF THE DRAWINGS

FIG. 1 is a diagrammatic illustration of one embodiment showing the safety apparatus according to the invention, FIG. 2 is a sectional view of an upper half of a low speed clutch portion thereof, FIG. 3 is a diagrammatic illustration of another embodiment of the safety apparatus according to the invention, and FIG. 4 is a sectional side view of a low speed clutch portion thereof.

DETAILED DESCRIPTION

Referring to FIG. 1, component 1 is a high speed clutch of the oil pressure operated type interposed in a high speed power transmission system. Component 2 is a low speed clutch of the oil pressure operated type interposed in a low speed power transmission system. The two clutches 1, 2 are selectively connected to an oil pressure source 4, comprising an oil pressure pump, through a shift valve 3. The operation of the value between components 1 and 3 is not essential to the operation of the apparatus of the invention and such value may be regarded as short-circuited.

Component 5 is an oil pressure chamber provided within the low speed clutch 2, and component 6 is an automatic control valve which is designed to operate above a predetermined high speed rotation of the low speed clutch 2 for bringing the low speed clutch 2 into its inoperative condition as will be explained in greater detail hereinafter. Component 7 is an oil tank connected to the intake side of the oil pressure pump 4, and components 8 and 9 respectively denote an oil pressure control circuit and a manual valve connected, in sequence, to the delivery side of the same pump 4.

The manual valve 9 has on its output side two right and left output circuits L and D, and it is so arranged that the right side circuit D is ordinarily selected to open. The valve 9 is a manual valve operable by a driver. Thus, the circuit D and the circuit L can be selected at will to be in communication with the power source 4. To obtain an automatic change-speed operation, the circuit D is selected. To obtain an operation of only the low speed clutch 2, the circuit L is selected. The shift valve 3 is so constructed that it can be changed over by sliding either to the left in FIG. 1, that is, to a high speed side by the action of a spring 10 provided at one end thereof or to the right in the same Figure, that is, a low speed side by the action of an operation member 11 such as an electromagnetic solenoid provided at the other end thereof. Each of the clutches 1, 2 is so constructed that it has an output side on the right in FIG. 1 and an input side on the left in the same Figure. Thus the high speed power transmission system and the low speed power transmission system are respectively constructed in almost the same manner as in a conventional one.

FIG. 2 shows details of the low speed clutch 2. Namely, the clutch 2 is so constructed that an outer member 13 which is keyed to an input shaft 12 connected to an engine side and an inner member 15 which has an output gear 14 connected to a wheel side are connectable to each other through a group of friction plates 17 which can be held compressed by a piston 16 movable by the action of pressure oil within the oil pressure chamber 5. Thus, the clutch 2 is not different in construction from a conventional one up to this point, but is different therefrom in the following respects. Namely, there is formed within the outer member 13 a valve chamber 19 which is in communication with the oil pressure chamber 5 through an opening 18 formed in one side wall thereof, and an automatic centrifugal type valve, that is, the foregoing automatic control valve 6 is contained in the valve chamber 19 so that the valve 6 is in an ordinary condition urged inwards by a spring 20 so as to close a valve opening 21 made in the other side wall thereof, and this valve assembly is connected through the valve opening 21 to an exhaust passage 22 connected to an external tank 23.

The operation of the apparatus is as follows: From the condition in which the shift valve 3 is moved by sliding to the left hand high speed side according to increase of the vehicle speed and thereby the left hand high speed clutch 1 is supplied with pressure oil from the oil pressure source 4 and is brought into its operating condition, if the shift valve 3 is accidentally changed over by sliding, for instance, by a certain erroneous operation, to the right hand low speed side as shown in FIG. 1, then the right hand low speed clutch 2 is connected through valve 3 to the oil pressure source 4 so as to be supplied therefrom with pressure oil. In this case, in the conventional apparatus, the clutch 2 is brought into its operating condition and thus the engine side and the wheel side are interconnected through the low speed transmission system and thereby there results such danger as a sudden engine braking, engine overrunning or the like.

On the contrary, according to the invention, in such a case as above, the low speed clutch 2 rotates above a predetermined speed, so that the automatic control valve 6 detects this and moves upwards in FIG. 2 against the action of the spring 20 to open the valve opening 21, whereby the pressure oil within the oil pressure chamber 5 is discharged to the exterior therethrough, and thus the clutch 2 is inoperative even by the supply of pressure oil thereto. In other words, even by an erroneous operation of the shift valve 3, the low speed power transmission system will not operate the dangers as mentioned above never materialize.

FIGS. 3 and 4 show another embodiment according to the invention. In this embodiment, the automatic control valve 6 provided in the low speed clutch 2 in the foregoing embodiment shown in FIGS. 1 and 2 is modified into a changeover type construction in which, by the operation thereof at the time when the clutch 2 rotates above a predetermined speed, a supply valve opening 24 for the oil pressure chamber 5 is closed and at the same time another valve opening 25 is opened, so that an oil pressure supply passage 26 for the chamber 5 is changed over from its connection with the chamber 5 to its connection with a passage 27 connected to an oil pressure chamber 28 within the high speed clutch 1.

Referring to FIG. 3, component 29 is a slide valve interposed between the shift valve 3 and the high speed clutch 1. Valve 29 is so constructed that ordinarily it is moved to the left by the action of a spring 30 to provide communication between the oil pressure chamber 28 of the high speed clutch 1 and the shift valve 3 through an annular passage 31 in the outer periphery of valve 29. When the passage 27 is supplied with pressure oil by opening of the valve opening as mentioned above, the valve 29 is moved to the right against the action of the spring 30 and thereby the foregoing communication through the annular passage 31 is interrupted. In place thereof, the pressure oil from the low speed clutch 2 side is applied to the oil pressure chamber 29 within the high speed clutch 1.

In greater detail, an annular pressure chamber 32 is formed at the left end of the slide valve 29 and the front end of passage 27 opens into chamber 32, so that by movement of the slide valve 29 to the right caused by the action of the pressure oil supplied from the low speed clutch 2, the pressure oil can be supplied to the oil pressure chamber 28 of the high speed clutch 1 through the pressure chamber 32.

Additionally, as shown in FIG. 3, the passage 27 is provided at an intermediate portion with a pressure sensitive switch 33 which is adapted to be closed by the action of the pressure oil flowing through the passage 27, so that by closing of switch 33 an indication device 34, such as a lamp or the like, may be operated to give a warning. Component 35 is an electric power source for the device 34. In FIGS. 3 and 4, various parts corresponding to those in FIGS. 1 and 2 are designated by the same reference numerals.

The operation of the device in FIGS. 3 and 4 is as follows: From the condition in which the shift valve 3 is moved to the left and the high speed clutch 1 is operated by being supplied with pressure oil and thus the vehicle is in its high speed running condition, if the shift valve 3 is accidentally moved to the right hand low speed side by an erroneous operation, the low speed clutch 2 is prepared to be supplied with pressure oil. In this case, the low speed clutch 2 rotates above a predetermined speed and thereby the automatic control valve 6a is moved upwards in FIG. 4, so that the supply valve opening 24 is closed and at the same time the valve opening 25 is opened, whereby the pressure oil within the oil pressure supply passage 26 does not flow to the oil pressure chamber 5 of the low speed clutch 2 but flows to the oil pressure chamber 28 of the high speed clutch 1 through the passage 27 and the pressure chamber 32 of the slide valve 29. Thereby the clutch 2 is not operated but the clutch 1 is rendered operative and thus the danger of a sudden engine braking, or the like, as often occurs in the conventional apparatus is prevented. If the valve 6a is moved upwards in FIG. 4, the supply valve opening 24 is closed and at the same time the valve opening 25 is opened, so that the pressure oil supplied from the oil pressure supply passage 26 is prevented from entering into the chamber 5 through the opening 24 but is supplied into the passage 27 through the opening 25. In this case, another valve opening 36 which is provided on the left side and is always in communication with the interior of the oil pressure chamber 5 is brought into communication with a drain opening 37 on the right sid through an intermediate annular passage 38, whereby the pressure oil within the oil pressure chamber 5 is allowed to drain off therethrough and thus the clutch 2 becomes inoperative.

If, then, the valve 6a is returned to the original position as illustrated, the valve opening 24 is opened and the valve opening 25 is closed. At the same time the valve opening 36 is in communication with the passage 26 through an axial opening 39. Thus, the oil pressure chamber 5 can be supplied with pressure oil for operation.

Thus, according to this invention, the automatic control valve which operates at a comparatively high speed rotation of the low speed clutch to make such clutch inoperative is provided, so that such danger as engine braking, engine overrunning or the like is prevented even when the shift valve is accidentally changed over from its high speed side to its low speed side during high speed running of the vehicle. According to another feature of the invention, furthermore, the automatic control valve is so constructed that, by the operation thereof, the pressure oil which is otherwise supplied to the low speed clutch is applied to the high speed clutch for keeping the same in its operating condition, so that not only are the above dangers prevented but also the high speed running of the vehicle is stably maintained.

What is claimed is:

1. In an automatic transmission apparatus for a vehicle of the type having a high speed clutch of an oil pressure operated type interposed in a high speed power transmission system and a low speed clutch of an oil pressure operated type interposed in a low speed power transmission system, a shift valve, the clutches being selectively connected through said shift valve to an oil pressure source, said low speed clutch being provided with an oil pressure chamber connectible to the pressure source, a safety apparatus comprising an automatic control valve coupled to said low speed clutch having a valve chamber in communication with said oil pressure chamber, said valve chamber having an outlet for relieving pressure in said oil pressure chamber, and a speed responsive valve member in said valve chamber for selectively opening said outlet thereof when the speed of rotation of the low speed clutch reaches a predetermined value; and said high speed clutch having a pressure chamber, said apparatus further comprising means connected to said outlet and to said pressure chamber of the high speed clutch for supplying pressure fluid fed to the low speed clutch to said high speed clutch when said automatic control valve is open.

2. A safety apparatus as claimed in claim 1 wherein said means connected to said outlet and to said pressure chamber comprises a conduit connected to said outlet, and a slide valve connected to said conduit and to said pressure chamber of said high speed clutch.

3. A safety apparatus as claimed in claim 1 comprising indicator means coupled to said conduit for being operated by flow of pressure fluid therein when said automatic control valve is open.

4. A safety apparatus as claimed in claim 1 wherein said slide valve has a pressure chamber connected to said conduit, a slide valve member subject to the pressure in said pressure chamber, and a bias spring acting on the slide valve member to yieldably oppose displacement of the slide valve member when the pressure chamber is supplied with pressure fluid from said low speed clutch.

* * * * *